United States Patent [19]
Morford

[11] 4,048,745
[45] Sept. 20, 1977

[54] RODENT TRAP

[76] Inventor: Marvin A. Morford, 1815 Ashworth Road, West Des Moines, Iowa 50265

[21] Appl. No.: 644,579

[22] Filed: Dec. 29, 1975

[51] Int. Cl.² ............................................. A01M 23/04
[52] U.S. Cl. ........................................................ 43/69
[58] Field of Search .......................... 43/69, 70, 111, 66

[56] References Cited

U.S. PATENT DOCUMENTS

| | | | |
|---|---|---|---|
| 1,505,783 | 8/1924 | Harty | 43/70 |
| 1,632,276 | 6/1927 | Torriente | 43/111 |
| 3,786,591 | 1/1974 | Morford | 43/66 |

FOREIGN PATENT DOCUMENTS

| | | | |
|---|---|---|---|
| 52,757 | 3/1912 | Austria | 43/69 |
| 1,133,462 | 11/1956 | France | 43/69 |

*Primary Examiner*—Warner H. Camp
*Attorney, Agent, or Firm*—Zarley, McKee, Thomte, Voorhees & Sease

[57] ABSTRACT

A housing includes a holding compartment and passageway in side-by-side relationship and with the passageway having inwardly and upwardly extending ramps at its opposite inlet openings. The ramps terminate at a pivotal trap door which, upon being opened, places the passageway in communication with the holding compartment. A deflector wall is positioned under the trap door and extends downwardly and inwardly towards the holding compartment. A lid for the housing has a transparent portion over the holding compartment and an opaque portion over the passageway.

13 Claims, 4 Drawing Figures

RODENT TRAP

BACKGROUND OF THE INVENTION

A rodent trap for mice and other rodents is needed which does not kill and maim the animal during operation of the trap. The trap needs to be simple in design and construction and easy to empty. It is further desirable that it be possible to visually check the inside of the trap without opening it. The entrance to the trip should expose a dark passageway which is inviting to a rodent. Rodents should be able to enter from either end of the trap and the trap should be capable of being placed along the wall such that the access openings are in the travel path of the rodents.

SUMMARY OF THE INVENTION

The rodent trap of this invention includes a passageway having access openings at opposite ends with upwardly extending ramps being positioned at the access openings and terminating at a downwardly pivotal trap door midway between opposite ends of the trap. The passageway is in communication with a holding compartment through an access opening upon the trap door being pivoted down by the weight of the rodent upon stepping upon the door. The rodent is deflected downwardly and laterally towards the access opening into the holding compartment and a deflector wall extends downwardly and laterally inwardly toward the holding compartment under the trap door to keep rodents from under the trap door that might otherwise interfere with the trap door's operation. A slidable top is provided on the trap and provides access into the holding compartment and the passageway and upon being moved to one end permits easy emptying of the holding compartment. The lid is opaque over the passageway and transparent over the holding compartment thereby allowing visual inspection of the holding compartment.

DESCRIPTION OF THE PREFERRED EMBODIMENT

Figure 1:
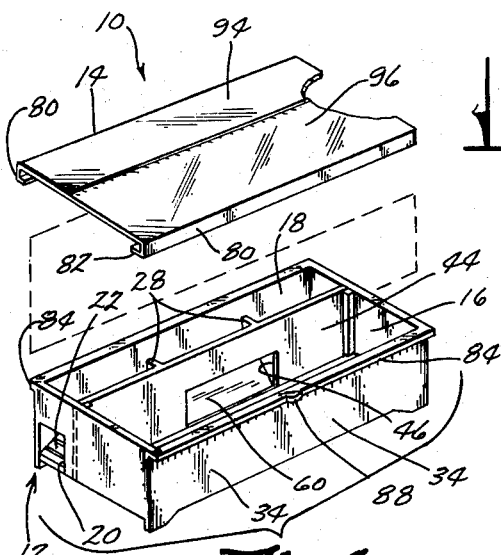
FIG. 1 is an exploded perspective view of the rodent trap of this invention.
Figure 2:
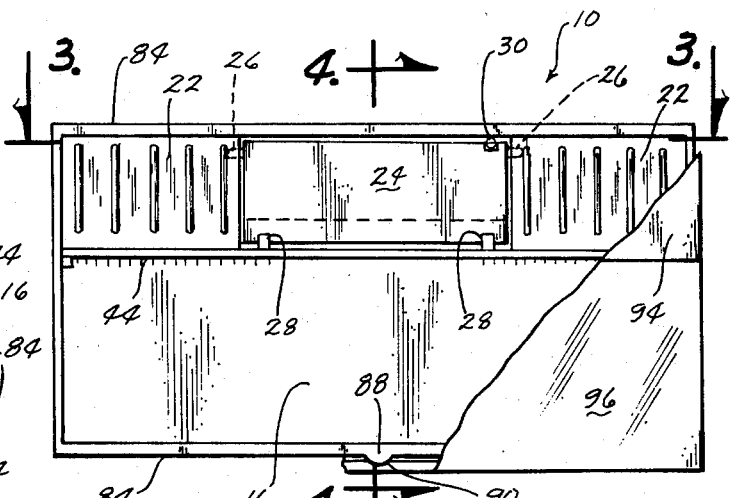
FIG. 2 is a fragmentary top plan view thereof.

The rodent trap of this invention is generally referred to in FIG. 1 by the reference numeral 10 and includes a housing 12 having a lid 14. The housing includes a rodent holding compartment 16 and a passageway 18 running the full length of the housing 12 and having inlet openings 20 at opposite ends.

Positioned in the passageway 18 at the inlet openings 20 are upwardly and inwardly extending ramps 22 which terminate at a downwardly pivotal trap door 24. The trap door 24 is pivotal on pins 26 and is maintained in a horizontal closed position against stops 28 by a spring 30.

A housing 12 includes oppositely disposed side walls 34 and 36 and a bottom wall 38. Below the trap door 24 is a chamber 40 defined by end walls 42 and the exterior housing side wall 36. The opposite side wall for the chamber 40 is an interior wall 44 extending the length of the housing and includes an opening 46 which provides communication and access into the holding compartment 16 from the passageway 18 when the trap door 24 is in its down open position as indicated by the dash lines in FIG. 4. In the open position the trap door extends downwardly and inwardly toward the access opening 46 thereby deflecting rodents 50 downwardly and inwardly into the holding compartment 16 through the access opening 46.

Positioned below the trap door 24 is a deflector wall 60 extending from the exterior housing wall 36 downwardly and inwardly towards the interior wall 44 thereby keeping rodents out from under the trap door 24.

Figure 3:
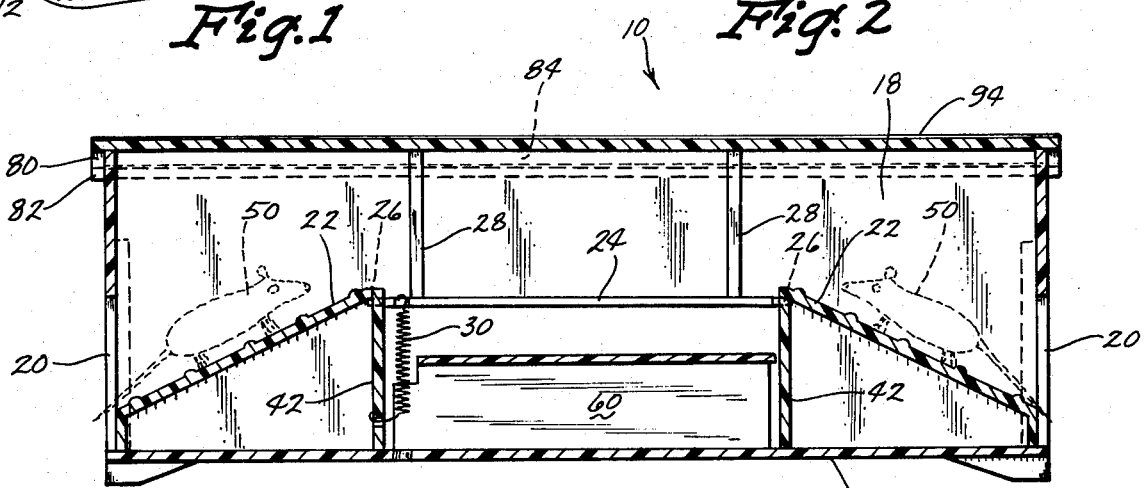
FIG. 3 is a side elevation view taken along line 3—3 in FIG. 2.

The trap door 24 is limited against upward pivotal movement beyond a horizontal closed position, as seen in FIG. 3, by stops 28 on the interior wall 44 in the passageway 18. The ramps 22 leading up to the trap door 24 are seen to include upstanding transversely extending treads 72 to prevent the rodents from slipping when walking up the ramps to the trap door 24.

The lid 14 includes downwardly extending flanges 80 along its opposite sides each of which include inwardly facing grooves 82 which receive outwardly extending ribs 84 on the upper exterior surfaces of the outside housing walls 34 and 36.

Cooperating locking elements are provided on the housing and the lid and include a nodule 88 on one of the ribs 84 as seen in FIG. 1 with the nodule being received in a depression 90 formed in the groove 82 of the cooperating leg 80 on the lid 14. It is further seen that opaque material 94 is placed on the lid 14 over the passageway 18 to maintain the passageway as dark as possible while the lid portion 96 over the holding compartment 16 is transparent thus giving visual access into the holding compartment for inspection purposes.

Figure 4:
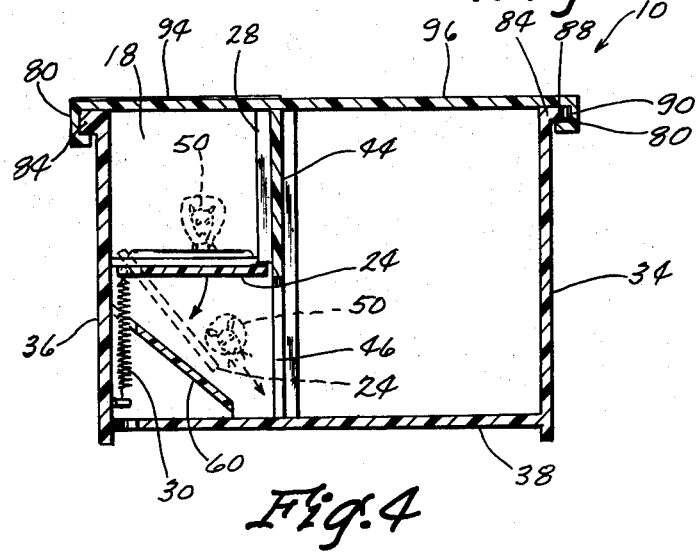
FIG. 4 is a cross sectional view taken along line 4—4 in FIG. 2.

In operation it is seen that the rodent trap of this invention may be easily constructed of preferably plastic material. The trap is placed next to a building wall with the inlet openings 20 to the passageway 18 being in the travel path of the rodents 50. Since the passageway 18 is along the exterior housing wall 36 the passageway will be next to the building wall against which the trap is placed thereby making access to the trap convenient for the rodents. The rodent will be enticed into the inlet openings 20 by the fact that the passageway is dark and rodents like dark areas which seem to offer protection. The rodent 50 will walk up the ramps 22, as seen in FIG. 3, and then onto the trap door 24 and their own weight will be sufficient to overcome the tension in the spring 30 thereby causing the door to pivot downwardly to the dash-line position, as seen in FIG. 4 and in turn deflecting the rodent 50 downwardly and laterally towards the access opening 46 leading into the holding compartment 16 where the rodent will be held until the trap is emptied. The rodent cannot return to the passageway since the trap door 24 will return to its horizontal closed position, as seen by the solid lines in FIG. 4. The rodent also cannot move under the passageway or the trap door 24 due to the fact that a deflector wall 60 is provided which extends downwardly and inwardly towards the holding compartment 16. When the operator of the trap visually inspects the trap and determines that it needs to be emptied due to one or more rodents being detained in the holding compartment 16, it is only necessary to slide the lid 14 to one end or the other overcoming the initial resistance of the locking nodule 88 being received in the depression 90 in the downwardly extending leg 80 having the groove 82.

The trap is turned upside down and the rodents are disposed of. Upon closing the lid the trap is ready to be reused. Should the lid be totally removed it can only be put back on such that the opaque portion 94 is over the passageway 18 due to the fact that the ribs 84, as seen in FIG. 4, and their associated grooves 80 are different in size and cross section. As viewed in FIG. 4, the larger rib and groove is on the left-hand side as compared to the corresponding structure on the right-hand side.

I claim:

1. A rodent trap comprising, a housing having a passageway extending between opposite ends of said housing and a holding compartment in side-by-side adjacent relationship to said passageway, said compartment having an access opening for communication with said passageway, said passageway including access openings at opposite ends and ramps extending inwardly and upwardly from said opposite ends and terminating at a trap door, said trap door being pivotal downwardly placing said passageway in communication with said holding compartment access opening whereby a rodent stepping onto said trap door is dropped downwardly to a position for entry into said storage compartment through said access opening, said housing including a slidable lid extending over said passageway and holding compartment, said lid having an opaque portion over said passageway whereby light cannot enter said passageway through said lid, and cooperating slide fastening means on said housing and lid of such a configuration that the lid can only be positioned on said housing in one way with said opaque portion over said passageway.

2. The structure of claim 1 wherein a deflector wall is positioned under said trap door and extends downwardly and laterally inwardly towards said holding compartment access opening thereby keeping rodents in said holding compartment from moving under said trap door.

3. The structure of claim 3 wherein said trap door and access opening into said holding compartment are midway between the opposite ends of said housing, said trap door is positioned partially midway between the top and bottom of said housing.

4. The structure of claim 1 wherein a spring means is connected to said trap door to normally maintain it in a raised closed position and stop means are positioned in the travel path of said trap door to limit upward pivotal movement to a closed horizontal position.

5. The structure of claim 1 wherein said access opening into said holding compartment is the only continuously open opening into said compartment.

6. The structure of claim 1 wherein said passageway and said oppositely disposed access openings into said passageway are disposed at one side of said housing with the outside housing wall forming one side of said passageway thereby allowing said access openings to be close to a building wall along which rodents travel when said trap is placed along a building wall.

7. The structure of claim 1 wherein said cooperating slide fastening means on said housing and lid include cooperating ribs and grooves on opposite sides of said housing and lid.

8. The structure of claim 7 wherein one of said ribs and one of said grooves includes cooperating yieldable locking elements to maintain said lid in a closed position.

9. The structure of claim 7 wherein said cooperating rib and groove on one side are larger than the cooperating rib and groove on the opposite side.

10. The structure of claim 9 wherein each of said grooves is defined as a downwardly extending flange along each longitudinal side of said lid.

11. The structure of claim 7 wherein said grooves are included in oppositely disposed side flanges on said lid which receive ribs on oppositely disposed exterior side walls of said housing whereby said passageway and holding compartment are completely accessible by sliding said lid to either end of said housing.

12. The structure of claim 1 wherein said opaque portion includes a separate piece of material on said lid.

13. A rodent trap comprising, a housing having a passageway extending between opposite ends of said housing and a holding compartment in side-by-side adjacent relationship to said passageway, said compartment having an access opening for communication with said passageway, said passageway including access openings at opposite sites ends and ramps extending inwardly and upwardly from said opposite ends and terminating at a trap door, said trap door being pivotal downwardly placing said passageway in communication with said holding compartment access opening whereby a rodent stepping onto said trap door is dropped downwardly into said holding compartment, a slidable lid on said housing, extending over said passageway and said holding compartment and the portion over said passageway being opaque and the portion over said holding compartment being transparent whereby light cannot enter said passageway from the top through said lid and the interior of said holding compartment being visible from the top through said transparent lid portion, and cooperating rib and groove slide fastening means on said housing and lid and the configuration of said rib and groove means being such that the lid can only be positioned on said housing in one way.

* * * * *